United States Patent [19]

Chipperfield

[11] Patent Number: 5,485,226
[45] Date of Patent: Jan. 16, 1996

[54] HOOD ASSEMBLY FOR A VIDEO DISPLAY UNIT

[76] Inventor: John S. Chipperfield, Birch Croft, Pinelands Rd., Chilworth, Southampton SO1 7HH, England

[21] Appl. No.: 213,212

[22] Filed: Mar. 15, 1994

[30] Foreign Application Priority Data

Dec. 9, 1993 [GB] United Kingdom ............ 9325210

[51] Int. Cl.$^6$ .............. H04N 5/645; G03B 21/22; G03B 21/14
[52] U.S. Cl. ............. 348/836; 348/782; 348/786; 348/841; 353/75; 353/97
[58] Field of Search .................. 348/834, 836, 348/842, 841, 115, 782, 786, 787; D14/100, 106, 114; 353/75, 97

[56] References Cited

U.S. PATENT DOCUMENTS

| | | | |
|---|---|---|---|
| 2,883,902 | 4/1959 | Oppenheimer | 88/16 |
| 2,934,601 | 4/1960 | Oppenheimer | 178/6.8 |
| 4,049,907 | 9/1977 | Damon | 358/185 |
| 4,097,902 | 6/1978 | Curnuck | 348/842 |
| 4,612,583 | 9/1986 | Ayervais | 348/842 |

FOREIGN PATENT DOCUMENTS

| | | |
|---|---|---|
| 898770 | 6/1962 | United Kingdom . |
| 930848 | 7/1963 | United Kingdom . |
| 2238937 | 12/1991 | United Kingdom . |

OTHER PUBLICATIONS

IEEE Standard Dictionary of Electrical and Electronics Terms, 1984, pp. 966–967.
Heat Transfer Seventh Edition by J. P. Holman, 1990, pp. 385–389.
CRC Handbook of Chemistry and Physics by Robert Weast, 1983, pp. E–189, E–401, E384.
Concise Encyclopedia of Chemical Technology by Kirk Othmer, 1985, p. 923.

Primary Examiner—Edward L. Coles, Sr.
Assistant Examiner—Kimberly A. Williams
Attorney, Agent, or Firm—Eckert Seamans Cherin & Mellott

[57] ABSTRACT

A hood assembly for a display such as a VDU display comprises a partially reflecting mirror made from sheet material having a relatively low light transmittance, in the range 25% to 45%, and most preferably in the range 32.5 to 37.5%.

6 Claims, 3 Drawing Sheets

HOOD ASSEMBLY FOR A VIDEO DISPLAY UNIT

BACKGROUND OF THE INVENTION

This invention relates to a hood assembly for use with a display to reduce unwanted light reflected from a surface of the display. The display may be, for example, a VDU screen, a traffic light or a viewing window, but other applications are described later.

When a VDU screen is viewed under conditions of high ambient light, such as when a television monitor is used for an outside broadcast, or when sun shines on the VDU screen of a bank-note dispensing machine, the ambient light reflected from the screen can make it extremely difficult for the user to discern the image displayed on the screen.

Also, VDU screens used in normal office lighting conditions can cause eye strain.

Although various filter devices are available for mounting over VDU screens, they are not generally found to alleviate the problem to any significant degree, despite their substantial cost in many cases.

We are aware that hood assemblies for cathode ray tube devices were disclosed in patent specifications no. GB 898770 and 930848 of Decca. Such hood assemblies incorporated an inclined filter. The filter of GB 930848 is described as 'a neutral filter or a tinted filter' but the filter characteristics are not described. The filter of GB 898770 is a circularly-polarising filter.

Although the hood assemblies of those specifications were described as being suitable for use with television receivers such devices are not commercially available despite the widely-acknowledged problem of eye-strain caused by viewing VDU displays for long periods.

The use of a clear polycarbonate filter in a hood assembly has also been proposed in specification GB 2238937A published as recently as 1991.

I have discovered quite unexpectedly that a hood assembly incorporating a partially reflecting mirror having a relatively low light transmittance provides greatly increased visibility of a VDU display in high ambient light conditions, despite the fact that a low light transmittance mirror would be expected to reduce the overall amount of light reaching the user's eye from the VDU display. In practice the perceived contrast of the display is increased.

SUMMARY OF THE INVENTION

According to the invention a hood assembly for use with a display comprises a substantially tubular hood having an internal surface of low reflectance to visible radiation, and a partially reflecting mirror positioned, or adapted to be positioned inside the hood to extend at an acute angle to the axis of the hood. Preferably the partially reflecting mirror is a suitable sheet material having a visible light transmittance in the range substantially 25% to substantially 45%.

Preferably the partially reflecting has a visible light transmittance in the range substantially 30% to substantially 40%.

Most preferably the partially reflecting mirror has a visible light transmittance in the range substantially 32.5% to substantially 37.5%.

The partially reflecting mirror is preferably a sheet of plastics material coated with a metallic layer, such as a layer of silver. The metallic layer may be partially reflective film as applied to windows, but preferably the metallic layer is applied to the sheet of plastics material by vacuum deposition.

The hood can be of any convenient cross-sectional dimensions compatible with the dimensions of the display, such that the hood can be mounted on the display and the axis of the hood extends normal to the plane of the display.

For a conventional rectangular VDU screen the rear end of the hood which is adjacent to the screen is preferably of corresponding cross-sectional shape but of slightly larger transverse dimensions.

The hood may be of substantially uniform cross-section throughout its length or the hood may be flared outwardly, that is proceeding in the direction away from the screen.

Alternatively, the hood may be tapered inwardly, that is proceeding in the direction away from the display.

An outwardly flared hood would provide a wider permissible angle of viewing the display, as would be desirable for displays to be viewed by a crowd in public places, such as a VDU screen on a station or in a Post Office. An inwardly tapered hood, on the other hand, can have the advantage that the user sees only the display when looking into the hood, without a border formed by the internal walls of the hood body.

When, however, a degree of security is desirable, a hood of substantially uniform cross-section can help to prevent persons other than the VDU operator from viewing the information displayed.

When the mirror is substantially flat, the mirror is preferably positioned at an angle in the range substantially 35° to substantially 55° to the axis of the hood, and most preferably at an angle of substantially 40° to substantially 50° to the axis. In one preferred embodiment the angle is substantially 45°.

The mirror can be arranged to reflect a major portion of the unwanted ambient light onto the internal surface of the hood, the length of the hood in front of the mirror being arranged to be such that at least most of the ambient light reflected by the mirror falls onto said internal surface.

The mirror can be curved generally about a horizontal axis of curvature positioned in front of and below the hood.

When the hood is of polygonal cross-section it is preferably constructed from flat sheet material which is folded into a tubular shape. The sheet material is preferably a corrugated plastics material such as CORREX (™). Folding of this material is facilitated by pre-scoring along the desired fold lines.

A hood constructed from flat sheet material is preferably supplied in a flat condition, abutment means being carried by opposed walls of the hood to locate the mirror in the desired position after the hood has been erected.

The mirror is then preferably hingedly attached to one wall of the hood and the mirror lies substantially flat against that wall when the hood is in the flat condition.

The abutment means are preferably carried by cords which pass through holes in opposed walls of the hood, said one wall connecting said opposed wall, and the arrangement is such that when the cords are pulled the mirror is pivoted by the abutment means from its position lying flat against said one wall to the operative position in which the mirror extends at said acute angle.

The abutment means may be knots or beads on the free ends of the cords.

The cords are preferably used to secure the hood assembly to the display device, conveniently by an elasticated luggage bungee.

The rear end of the hood may be provided with a cushioning strip around its periphery to assist in effecting a snug fit with the display means.

The wall of the hood that is uppermost in a daylight situation is preferably longer than the lower wall.

BRIEF DESCRIPTION OF THE DRAWINGS

Hood assemblies in accordance with the invention will now be described, by way of example only, with reference to the accompanying schematic drawings, in which.

DESCRIPTION OF THE PREFERRED EMBODIMENTS

The hood 1 of the illustrated hood assembly 2 is constructed from black CORREX (™) corrugated plastics packaging material, the corrugations extending lengthwise of the hood.

Figure 1:
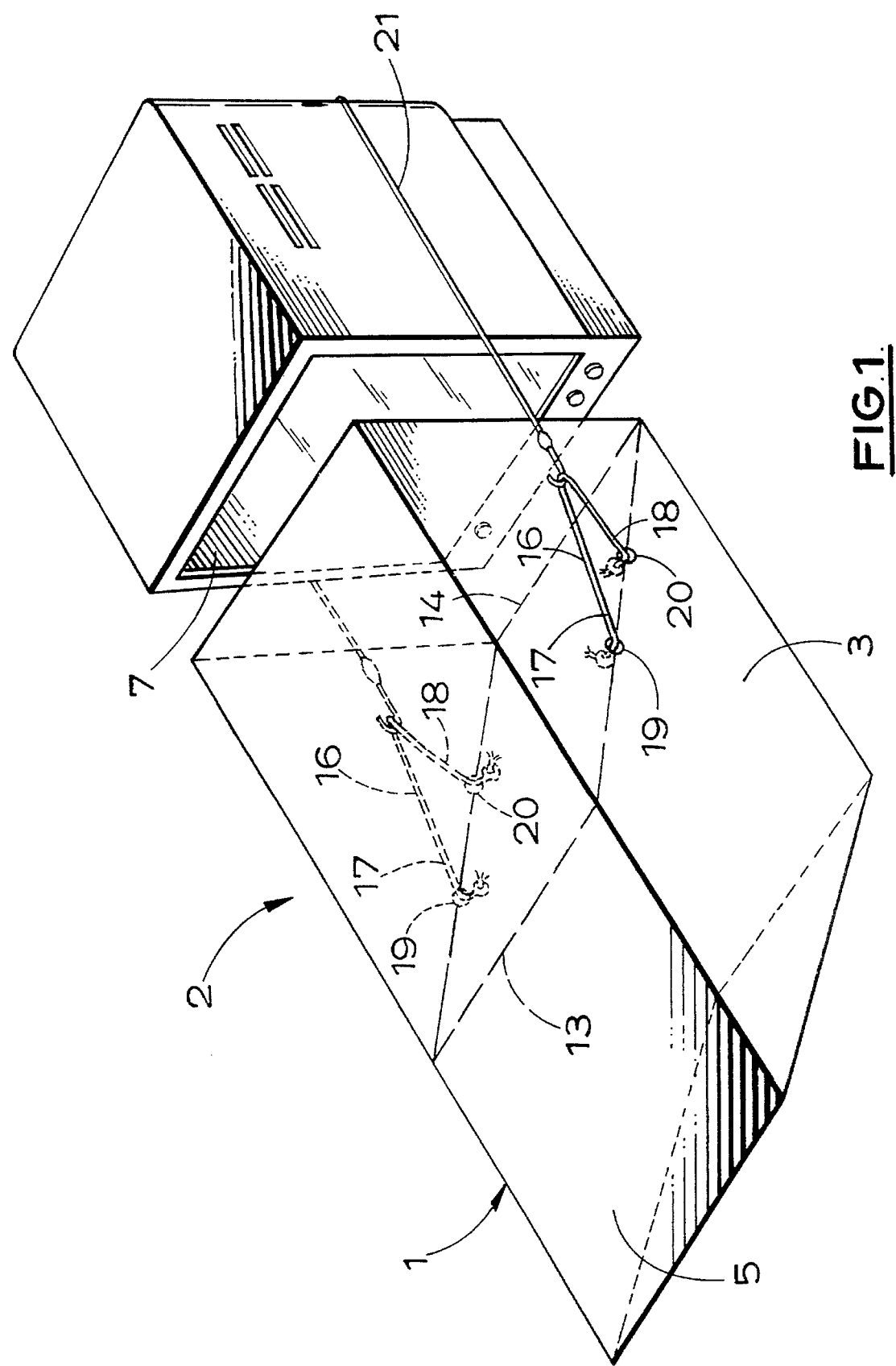
FIG. 1 is a perspective view of the erected foldable-flat hood assembly about to be secured in position on a 9" SONY (™) television monitor.
Figure 3:
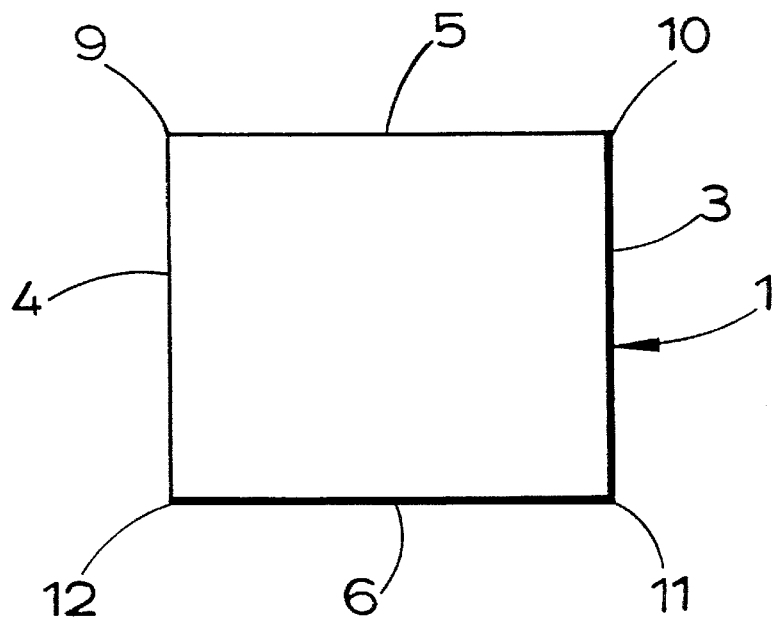
FIG. 3 is an end elevation of the erected hood assembly.

As shown in FIGS. 1 and 3 the hood is of generally tubular shape having an oblong-rectangular transverse cross-section which is constant, that is the walls of the hood are not flared outwards in the illustrated embodiment. The hood has opposed side-walls 3, 4 of right-angle trapezoidal shape, an oblong-rectangular upper wall 5 and a substantially square lower wall 6. The longer upper wall 5 provides shading of the TV monitor screen 7 from the light of bright room lights.

Figure 4:
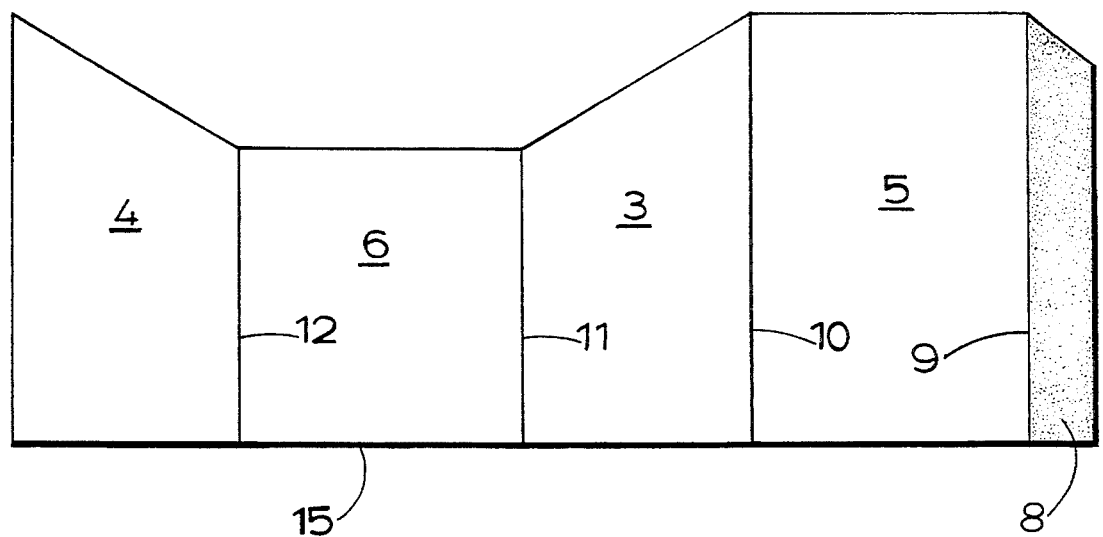
FIG. 4 is a plan view of the cut-out sheet material for folding to produce the hood of FIG. 1.

FIG. 4 shows the cut-out of CORREX (™) material having an attachment flap 8 which is adhesively secured to the longer margin of wall 4 after folding of the material along fold lines 9 to 12, or at least on lines 9 and 11. The fold lines 9 to 12 are pre-scored in conventional manner, or by slitting one layer of the CORREX (™) material. Once the flap 8 has been secured to wall 4 the hood is in the form of a foldable-flat tube of oblong-rectangular transverse cross-section, shown in FIG. 3. The tube will fold flat simply by initially distorting its shape into that of a parallelogram, folding taking place on lines 9 to 12.

Figure 2:
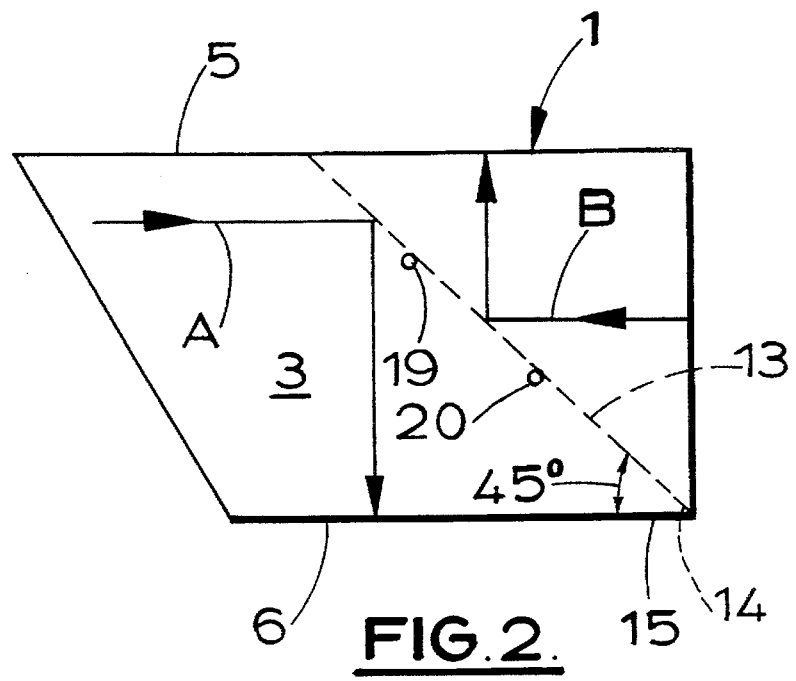
FIG. 2 is a side elevation of the erected hood assembly.

A planar partially-reflecting mirror 13 is located in the erected hood so as to extend at an angle of substantially 45° to the longitudinal axis of the tubular hood, as shown in FIGS. 1 and 2, the mirror extending almost fully between all four walls 3 to 6 of the hood, the rear edge 14 of the mirror 13 being hinged to the rear edge 15 of the lower wall by a strip of adhesive tape, not shown, to enable the mirror 13 to be hinged downwardly from the position indicated by broken lines in FIGS. 1, 2 to a folded condition in which the mirror lies parallel and slightly spaced from the lower wall 6. This slight spacing is to accommodate some cord knots as will now be described.

The hinged connection between the mirror and lower wall 6 enables the hood assembly to be supplied to the user folded flat in an envelope. Once the hood has been erected into its tubular shape, the mirror can be hinged upwards to its operative position. This is achieved by a pair of cords 16 which each have opposed ends 17, 18 extending through respective holes 19, 20 in the respective side-wall 3, 4. The ends of the cords are knotted within the hood. As shown in FIG. 2, the holes 19, 20 are just beneath the mirror 13 when the mirror is in the operative position, and since the mirror extends almost fully between the side-walls 3, 4, the mirror is supported on the cord knots and, moreover, the mirror is brought from its folded condition lying closely against lower wall 6 to its operative position simply by pulling on cords 16.

The cross-sectional dimensions of the hood 1 are such that the rear end of the hood fits snugly around the screen face 7 of a TV monitor, and the hood assembly is conveniently held in place by an elasticated luggage bungee 21 hooked at its opposite ends to the respective cords 16, the bungee being positioned to extend around the rear of the monitor.

The action of the semi-reflecting mirror is to reflect a substantial part of the incident light, indicated by ray A in FIG. 2, downwards onto a matt black interior surface of lower wall 6 where the light is effectively absorbed, and also to reflect a substantial part of the light B emitted from the VDU screen, or any light reflected from the VDU screen, onto the matt black interior surface of the upper wall 5.

The semi-reflecting mirror is a flat sheet of polycarbonate material on which a coating of silver has been applied by vacuum deposition, the density of the coating being chosen to provide a visible light transmittance of 35% for the coated sheet.

The length of the lower wall 6 is chosen such that a viewer looking into the hood, in the direction of arrow A, sees, by reflection in mirror 13, only a matt black surface. If, on the other hand, the lower wall were to be made too short, the user might see some light which reaches the mirror 13 past the front edge of wall 6.

The hood assembly may be modified by the provision of a black annular screen surrounding the rear end of the hood, to provide a black background against which the user is viewing the display.

Other examples of possible uses of the inventive hood assembly are as follows:

Any light-emitting screen or VDU susceptible to reflection, Radar Screens, Video Walls, Information System Screens, all Public Monitor Systems, Security Camera Screens, ATM Screens, Maintenance and Technical Equipment Screens, and Computer Screens.

We also consider that a relatively large hood assembly could be positioned in front of a window through which a viewer can view a room containing an exhibit under lighting conditions in which the window would, in the absence of the hood assembly, be subject to bright external light.

Figure 5:
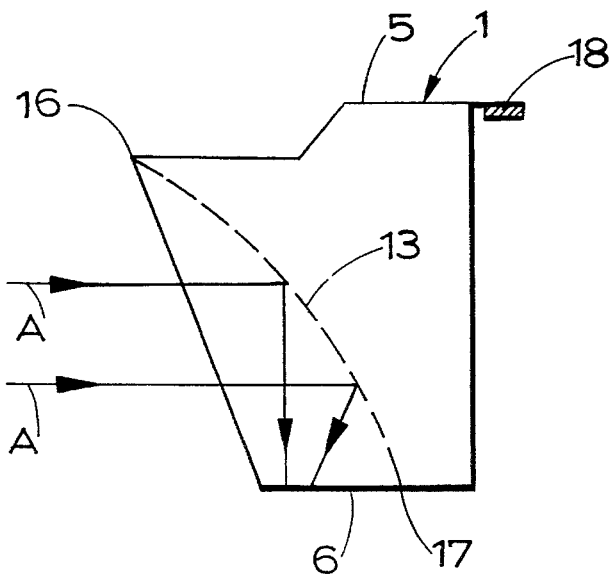
FIG. 5 is a view similar to FIG. 2 of a modification.

FIG. 5 shows a modified hood assembly in which a curved partially reflecting mirror 13 is employed. The mirror is curved about an axis X positioned in front of and below the hood. The mirror extends from the front upper corner 16 of the hood to an intermediate point 17 of the lower wall 6. Such a hood assembly can be made more compact than the hood of FIG. 2 since the incident light A tends to be focussed into a more localised area of the lower wall 6, which consequently can be made shorter.

The curved mirror 13 is formed of clear polycarbonate sheet which is coated, by vacuum deposition, on the rearwardly facing surface thereof with a silver coating.

The coating has been applied to a density to provide a visible light transmittance of 35% for the coated sheet.

The hood of FIG. 5 can conveniently be attached to a VDU by means of VELCRO (™) hook and loop fastener material applied to a rearwardly projecting lip 18, the lip fitting over the top corner of a VDU.

I claim:

1. A hood assembly for use with a display having an outwardly facing display surface to reduce unwanted ambient light reflected from said outwardly facing display surface, said hood assembly comprising a tubular hood body having internal wall surfaces, said hood body having a rear end shaped to fit said display whereby said hood has an axis extending generally normal to said display surface, and a partially reflecting mirror located inside said hood to extend at an acute angle to said hood axis, said internal wall surfaces having a low reflectance; wherein said partially reflecting mirror comprises a sheet of transparent material carrying a metallic layer, and wherein said partially reflecting mirror has a visible light transmittance in the range substantially 25% to substantially 45%.

2. A hood assembly as claimed in claim 1 wherein said sheet is a polycarbonate sheet and said metallic layer is a layer of silver.

3. A hood assembly as claimed in claim 1 wherein said partially reflecting mirror has a visible light transmittance in the range substantially 30% to substantially 40%.

4. A hood assembly as claimed in claim 3 wherein said partially reflecting mirror has a visible light transmittance in the range substantially 32.5% to substantially 37.5%.

5. A hood assembly as claimed in claim 3 wherein said partially reflecting mirror has a visible light transmittance in the range substantially 35%.

6. A hood assembly as claimed in claim 1 wherein said mirror is curved generally about a horizontal axis of curvature positioned in front of and below said hood body.

* * * * *